Nov. 13, 1951 G. I. GOODWIN 2,574,966
FLEXIBLE CLUTCH PLATE
Filed Jan. 2, 1948 2 SHEETS—SHEET 1
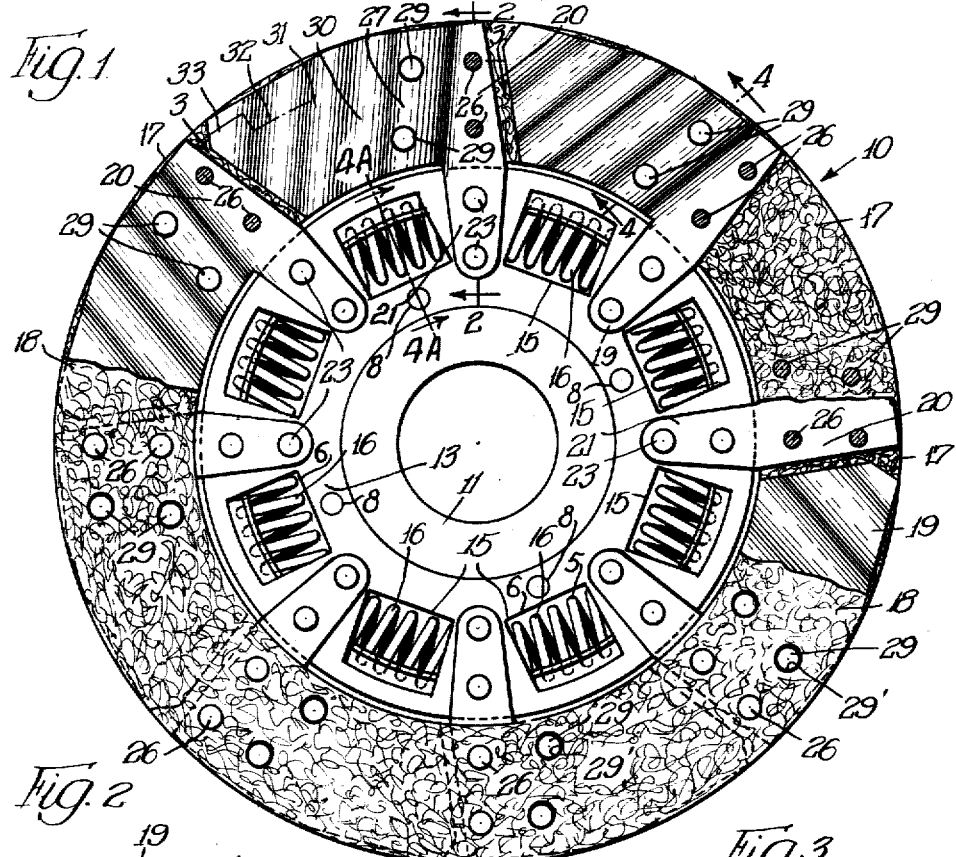
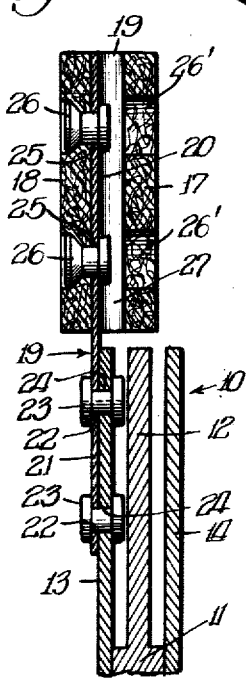
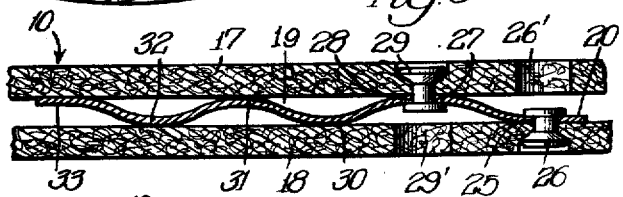
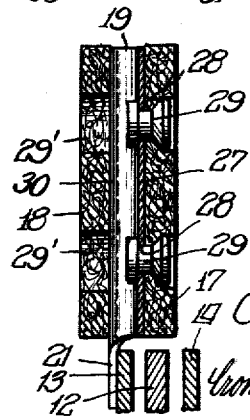
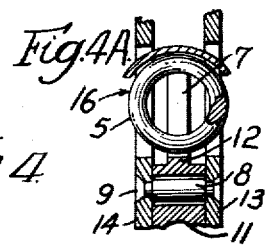
INVENTOR.
George I. Goodwin
BY
Cromwell, Greist & Warden
Attys.

Nov. 13, 1951 G. I. GOODWIN 2,574,966
FLEXIBLE CLUTCH PLATE
Filed Jan. 2, 1948 2 SHEETS—SHEET 2
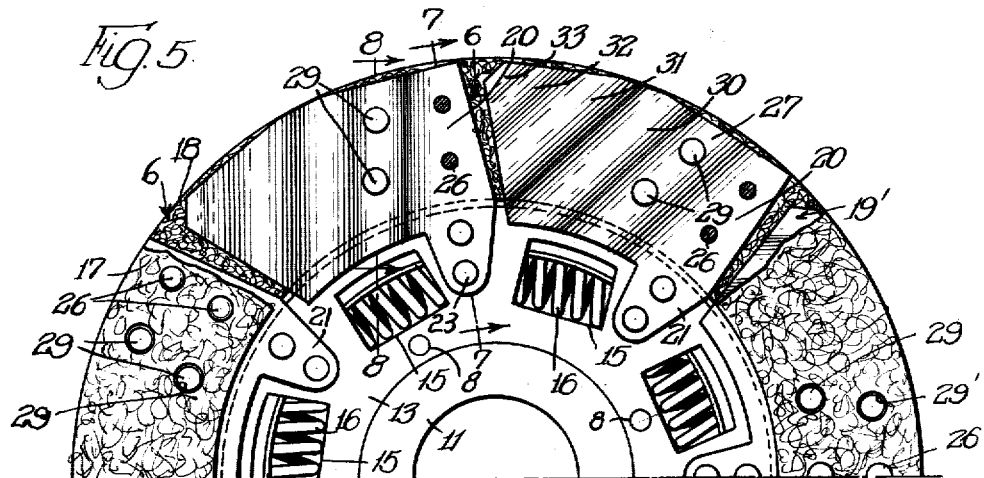
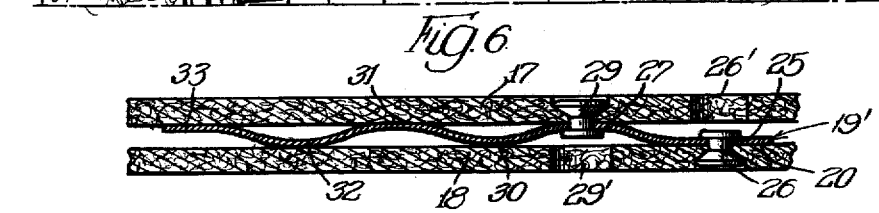
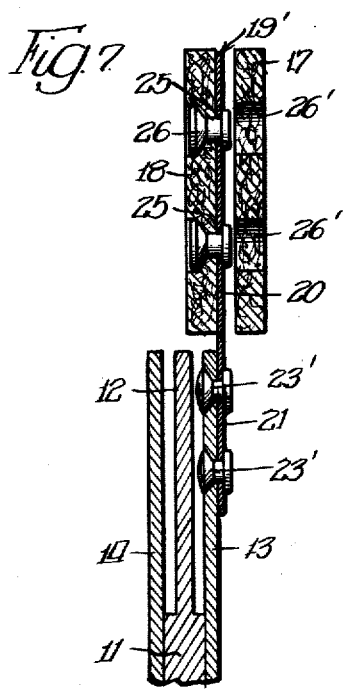
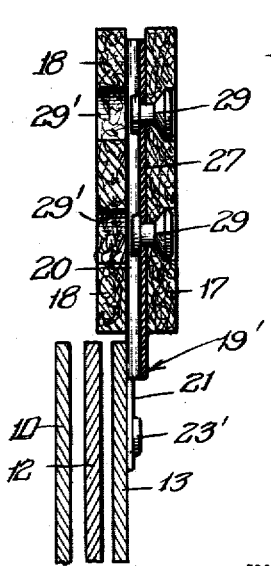
INVENTOR.
George I. Goodwin
BY
Cromwell, Greist + Warden
ATTYS.

Patented Nov. 13, 1951

2,574,966

UNITED STATES PATENT OFFICE 2,574,966

FLEXIBLE CLUTCH PLATE

George I. Goodwin, Birmingham, Mich.

Application January 2, 1948, Serial No. 42

5 Claims. (Cl. 192—107)

This invention relates to an improved clutch plate assembly for automotive and related installations. It is more particularly concerned with a novel arrangement of a plurality of resilient cushion members in relation to a central, torsion type mounting disk of the assembly.

Mounting disks of the foregoing type are usually characterized by a plurality of coiled springs disposed in apertures in the disk which are arranged in circumferentially spaced relation about the periphery thereof. These springs act as a torsional damper for the clutch plate. The cushion members referred to are also mounted in equally spaced circumferential relation about the disk periphery, usually by a pair of circumferentially spaced rivets disposed through the disk and through an inner, immobile attaching portion of the cushion. Manifestly, the circumferential spacing of each pair of rivets from one another must be sufficient to enable the shearing stress which arises between the rivets and attaching portion to be sustained. As a result, the rivet spacing is necessarily so great, and the attaching portion so wide in the circumferential direction, that it must either be disposed radially outwardly of the above referred to coiled torsion springs, or, if said attaching portion is to be disposed between adjacent springs, a reduction in the number of springs is necessitated in order to afford adequate circumferential space therebetween to receive said attaching portion. Both of these alternative procedures are objectionable, because of the less efficient location and/or distribution of the torsional springs which they entail. In general, they represent an inefficient use of the space available on the disk for the attachment of the cushions.

Recent developments in automotive engine design have resulted in the modern high compression, high torque engine, obviously calling for a clutch structure, having materially improved torque transmitting capacity than has heretofore been available in standard automotive clutches. At the same time the design of body and chassis structures tends increasingly to a low silhouette, small wheels and low road clearance, coupled with ample passenger space and footroom. The difficulty of designing a clutch plate suitable for the clutch assembly of a modern automobile is greatly increased by these two factors which are, in so far as the clutch problem is concerned, inconsistent with one another. Thus, torque transmitting capacity is directly proportional to the mean radius of the clutch facing and to the pressure thereon, hence high torque transmission would seem to call for a facing of large outer diameter, and an increase in the axial spring load thereon. However, a large diameter facing means an increase in the diameter of the clutch housing which is not permissible because it detracts from the footroom in the automobile or road clearance, or both. Neither situation can be tolerated. Moreover the increase involves an increase in polar spinning inertia, which is also objectionable. Furthermore the axial spring load on the clutch cannot be increased beyond a limit which is very definitely determined by the acceptacle load which can be imposed on the car operator at the clutch foot pedal. Therefore it can be seen that the solution to the problem resides not in the provision of a clutch plate having an outer diameter greater than those now employed in comparable installations, nor in increasing the clutch pressure, nor in increasing the thickness and stiffness of the clutch cushion springs, since this has been found to result in unsatisfactory resistance to fatigue failure, but rather in devising the structure of said assembly in such manner that it performs its intended function of preventing chatter and withstanding and transmitting axial compressive force in the most efficient manner possible.

This is accomplished in accordance with the present invention by a novel shaping and proportioning of the areas of the cushions of the clutch plate and in provisions for assembling the same on the mounting disk in the most space conserving fashion, both as regards the relation thereof to the central mounting disk of the clutch plate and to the annular clutch facings of the plate assembly. I provide a cushion which presents a multiplicity of undulatory spring supporting zones or areas, thus enabling the spring to be constructed of a minimum cross-sectional thickness. The number of these spring zones or areas is theoretically limited only by the fatigue life of the cushion, i. e., its tendency to fail under repeated extreme stress at a small localized and abruptly angled area. In order to increase the amount of the cushion available for said spring areas or zones, I have devised the attaching provisions of the cushion in a fashion to employ a minimum proportion thereof for securing the cushion to the friction facing and to the central mounting disk, while at the same time not interfering with usual structural features of said mounting disk, such as the torsion dampening springs thereof. In short, the cushion structure exhibits features of improvement with regard to its torque transmissive capacity and efficiency, and as regards its assembly with an existing type of mounting disk, which are correlated to the end of making the most efficient use of a cushion of given size, and thus in minimizing the size of a clutch assembly of maximum torque capacity.

It is therefore a general object of the invention to provide a clutch plate construction of maximum torque capacity and minimum overall dimension, hence well adapted for use in a modern automotive vehicle in which factors of internal space, road clearance and permissible clutch pedal pressure impose definite limitations on the clutch design, said clutch plate having a plurality of cushions devised for maximum efficiency in their springing action and in the mounting thereof to the plate assembly, whereby the available clutch space is used with maximum efficiency.

It is therefore another object of the invention to provide a clutch plate construction of the foregoing torsional damper type in which most efficient use is made of the disk space available internally of the inner diameter of the usual friction facings to support a plurality of cushion members.

A more specific object is to provide a clutch driven plate construction involving a mounting disk of conventional torsional damper type and a number of undulatory cushion members, in which said cushion members are attached to the mounting disk by means of radially extending attaching portions disposed in the spaces between the torsion damper springs, thereby making most efficient use of the space available on the disk surface and affording increased compactness of construction.

Yet another object is to provide a highly compact cushioned clutch plate assembly in which the cushions are secured to the mounting disk by radially spaced rivets in a radially extending attaching portion located between adjacent torsion springs, yet without objectionable necking down of the cushion members for their connection to the mounting disk such as might constitute a source of possible weakening of the cushion members.

A still further object is to provide a novel and improved resilient cushion member well suited to the foregoing purposes.

The foregoing statements are indicative in a general way of the nature of the invention, but other and more specific objects will be apparent to those skilled in the art upon a full understanding of the construction and operation of the device.

Two embodiments of the invention are presented herein for purposes of exemplification but it will be appreciated that the invention is susceptible of incorporation in other modified forms coming equally within the scope of the appended claims.

In the drawings,

Fig. 1 is a face view of the improved clutch plate in accordance with one of the embodiments of the invention, being broken away at parts thereof and sectioned in order to more clearly illustrate the relationship of the component disk, spring, cushion and facing elements of the assembly;

Figs. 2, 3 and 4 are enlarged fragmentary views taken respectively in section on lines corresponding to lines 2—2, 3—3 and 4—4 of Fig. 1, further illustrating the relationship of the various component elements of the assembly, and particularly showing the relative position of the clutch facings (which are partially omitted in Fig. 1) to the cushion members;

Fig. 4A is a fragmentary view in section along a line generally corresponding to line 4A—4A of Fig. 1, illustrating the manner of mounting certain plates of the build-up assembly with relation to one another and to certain torsion devices of the assembly;

Fig. 5 is a face view showing half of a clutch plate assembly in accordance with a further modification of the invention, being partially broken away and in section for clarity in the illustration of the details and their relation; and Figs. 6, 7 and 8 are enlarged fragmentary views in section respectively on lines 6—6, 7—7 and 8—8 of Fig. 5.

The present invention relates to improvements in clutch driven plates such as are associated concentrically of and between the fly wheel and clutch pressure plate of an automotive or related installation. As pointed out in the preceding paragraphs, increased compactness, efficiency and uniformity of spacing of the clutch plate cushions are obtained by providing thereon a radially extending attaching portion, in which rivet holes are formed in proper radial spacing to provide adequate strength, and by disposing said attaching portions between successive torsion springs of the disk in radially overlapped relation thereto.

Referring to Figs. 1 through 4, and in particular to Fig. 1, the reference numeral 10 generally designates a torsional damper type clutch driven plate such as is referred to above. This plate is made up of a central hub 11 adapted to be keyed or splined in fixed angular relation to a shaft between the engine fly wheel and clutch pressure plate, in well known fashion. An annular, disk-like flange 12 projects radially from the hub 11. Hub 11 has associated therewith and guided thereon, in any appropriate fashion, a pair of annular plates or disks on either side of said flange, including the mounting disk 13 on the left-hand side of the flange 12, to which the cushion members hereinafter described are attached, and the side plate or disk 14 on the right-hand side. Disks 13, 14 coact with certain torsion dampening springs or devices in the manner illustrated in my earlier Patent No. 2,309,950, dated February 2, 1943. As illustrated in Fig. 4A, the torsion springs 5 are received in openings 6 in the respective disks 13, 14 and in a recess 7 of the hub flange 12. Disks 13, 14 are secured to one another by rivets 8 extending through openings 9 of that flange. The arrangement of the torsion devices per se is entirely conventional and constitutes no part of the present invention, other than the relationship that those devices bear to the clutch plate cushions on disk 13.

The flange 12, disk 13 and side plate 14 are each provided with a like number of equally and circumferentially spaced openings 15 extending axially therethrough, and within the outer periphery thereof, as illustrated in Fig. 1. There are eight of these sets of openings in the illustrated form of the invention and each set accommodates a coiled spring 16. Said springs abut the respective opposite ends of the openings 15 and serve as torsion members to prevent shifting of the disk and plate elements 13, 14 with reference to the flange 12 when the clutch plate is rotatively driven. The purpose of these provisions is well known in clutch plate constructions of the present torsion type, and the present invention resides in a particular adoption of a cushion spring for use with such a construction, as well as to the novel relationship of the cushions and torsional features of the disk of the assembly.

The assembly is completed by the pair of like, annular friction facings 17, 18 which are associated therewith respectively on the pressure plate side and on the fly wheel side, and by the resilient, undulatory cushion members 19, which are attached to disk 13 and by which said friction facings are carried on the assembly.

Facings 17, 18 are identical in their dimensions and have an inner diameter which is somewhat greater than the O. D. of the hub flange 12 and mounting elements 13, 14, the facings being concentric with these parts.

As illustrated in Figs. 1 through 4, the cushions 19 are generally flag-shaped in outline, consisting of a flat marginal area 20 at one lateral side thereof from which a radially elongated, coplanar attaching ear 21 projects. However, the invention is equally applicable to cushions of a T-shaped outline having two oppositely projecting cushioning wings. However, as illustrated, the ear 21 has radially spaced rivet receiving openings 22 therein receiving rivets 23 by which it is secured to disk 13, and it will be noted that the ear 21 has its maximum width in the circumferential direction at the point where it crosses the outer periphery of the cushion supporting assembly, including the hub flange 12, disk 13 and plate 14. The width of said attaching ear is at least as great as the width of the necked-down attaching portions of conventional types of cushions, T-shaped or otherwise. Accordingly, a zone of maximum cross section and maximum strength and resistance to fracture is afforded at this critical area. The rivets 23 rigidly secure said attaching ear 21 flush against the outer, left, fly wheel side of the disk 13. Said disk is apertured at 24 to accommodate these rivets, the distance between said apertures being approximately the same as is employed in conventional cushions having the attaching rivets disposed in circumferential relation to one another. In other words, the spacing is adequate to withstand successfully the shear stress which arises from torque on the cushion under load.

The cushion members 19 are likewise provided with pairs of radially spaced rivet receiving holes 25 in the flat marginal zone 20 thereof outwardly of the attaching ear 21. These holes accommodate rivets 26 which fixedly secure clutch friction facing 18 to the cushion, said rivets 26 being countersunk in the facing 18. The other facing 17 is apertured at 26' to accommodate the rivet heads. Extending from the flat marginal area 20 toward the left, as viewed in Fig. 3, or in counterclockwise direction as viewed in Fig. 1, the cushion has the form of a polygon of elongated circumferential or angular dimension, generally in the outline of a flag or banner. However, other outlines are contemplated, as pointed out above. It has an undulatory or wavy shape in section, arising from the flat area 20 to a high or crest 27. This crest extends in uniform sectional shape across the cushion in a direction which is inclined somewhat to a true radius, as illustrated in Fig. 1, and it is provided with a pair of radially spaced holes 28 for the reception of rivets 29 by which the pressure plate facing 17 is attached to the cushion. The fly wheel side facing is apertured at 29' to receive the rivet heads.

Further extending leftwise or counterclockwise, the cushion next drops to a valley or low 30 which parallels the crest 27 across the radial dimension of the cushion and is coplanar with the flat area 20. After low 30 the cushion is shaped reversely to merge into a second crest 31 coplanar with and parallel to the crest 27, then to provide a low 32 coplanar with the valleys 20 and 30 and, like the latter, paralleling the crests across the cushion. A final high 33 is formed at the extreme reduced tip of the cushion and extends in the same parallel direction as and is coplanar with the crests 27, 31.

The successive undulations of the cushion have uniform contacting and supporting engagement along their respective lengths with the opposed surfaces of the facings 17, 18, in the manner clearly illustrated in Fig. 3, whereby said facings are uniformly sustained throughout the circumferential or angular dimension of the cushion. Moreover, it is apparent that on almost any given radial line through the assembly the cushioning action of the cushion members on the opposed facings 17, 18 occurs at more than one point, between the inner and outer peripheral margins of the facings. Increased uniformity of distribution of the axial force transmitted through the clutch plate is thereby obtained.

It will also be noted that the undulatory zones 32, 33 adjacent the trailing margin of each cushion angularly substantially overlap the adjacent flat area 20 of the succeeding cushion member, since said members are in closely adjacent relation, thereby affording proper uniformity of cushioning action in this particular zone.

The cushion attaching ears 21 are snugly and compactly nested between the successive openings 15 for the torsion springs 16, radially overlapping said openings and thereby affording a desirably large area to receive and accommodate an attaching ear of substantial size and strength. In other words, the arrangement makes maximum and most efficient use of the available space and material.

It is unnecessary to reduce the size of the attaching areas of the cushion, and thereby weaken the structure generally, in order to secure the cushion in place.

The embodiment illustrated in Figs. 5 through 8 is generally similar to that illustrated in Figs. 1 through 4, so that, in general, similar reference numerals have been employed to designate the parts of the same. However, it should be noted that the undulatory cushion members of this embodiment, denoted 19', are sufficiently wide in the radial dimension thereof to radially overlap the outer diameter of the mounting assembly to which they are attached, specifically the disk 13, whereas in the embodiment in Figs. 1 through 4 the undulatory area of the cushions is spaced radially outwardly of said disk. Also, in this modification the fly wheel side facing 18 axially overlaps disk 13, as illustrated in Figs. 7 and 8.

The form of Figs. 5 through 8 affords somewhat greater stability by reason of the support which the cushion receives from the disk 13 throughout a substantial arcuate length; moreover, the rivets 23' by which the cushions 19' are attached to the plates are countersunk in the latter for the purpose of affording more axial clearance. In other respects the construction is similar to the first form and derives all of the advantages of compactness, simplicity and economy, coupled with uniformity of distribution of cushion effect, which is found in the embodiments in Figs. 1 through 4.

I claim:

1. In a clutch plate assembly, the combination of a mounting disk of the type having means to accommodate a plurality of circumferentially spaced torsion devices disposed in approximately annular series around the mounting disk, and a plurality of cushion members each having an attaching portion extending radially inwardly of the disk periphery and secured to the disk between an adjacent pair of said torsion devices, and a circumferentially extending undulatory spring portion having a plurality of circumferentially alternating, oppositely facing, clutch facing engaging areas, said attaching portion having an outwardly extending, clutch facing engaging surface substantially coplanar therewith which is of relatively small circumferential width as compared to said spring portion, said surface being integrally connected at a side margin thereof to said spring portion and being integrally connected to the remainder of said attaching portion by a zone having a circumferential width comparable to that of said surface.

2. In a clutch plate assembly, the combination of a mounting disk of the type having means to accommodate a plurality of circumferentially spaced torsion devices disposed in approximately annular series around the mounting disk, a plurality of cushion members each having an attaching portion extending radially inwardly of the disk periphery and secured to the disk between an adjacent pair of said torsion devices, and a circumferentially extending undulatory spring portion having a plurality of circumferentially alternating, oppositely facing, clutch facing engaging areas, said attaching portion having an outwardly extending, clutch facing engaging surface substantially coplanar therewith which is of relatively small circumferential width as compared to said spring portion, said surface being integrally connected at a side margin thereof to said spring portion and being integrally connected to the remainder of said attaching portion by a zone having a circumferential width comparable to that of said surface, and radially spaced elements securing each of said attaching portions to said disk in said radially extending position.

3. In a clutch plate assembly, the combination of a mounting disk of the type provided with a plurality of spaced apertures disposed in a circumferential series therearound, and a plurality of undulatory cushion members equal in number to said apertures each having a radial attaching portion secured to said disk and a circumferentially extending, undulatory wing portion, said attaching portion projecting radially inwardly of the disk periphery and being disposed in radially overlapped relation to and between an adjacent pair of said apertures, said wing portion including alternate cushion areas of undulatory cross section extending substantially in a circumferential direction to one side of said attaching portion and overlapping the disk periphery in a radial sense.

4. A clutch plate assembly having a plurality of circumferentially spaced torsion devices disposed in approximately annular series around a mounting disk, and a plurality of cushion members, each of said members having a radially extending attaching portion, which attaching portion is secured by a pair of substantially radially aligned securing elements to the mounting disk in the area of the latter which lies between a pair of said torsion devices, and a circumferentially extending undulatory spring portion having a plurality of circumferentially alternating, oppositely facing, clutch facing engaging areas, said attaching portion having an outwardly extending, clutch facing engaging surface substantially coplanar therewith which is of relatively small circumferential width as compared to said spring portion, said surface being integrally connected at a side margin thereof to said spring portion and being integrally connected to the remainder of said attaching portion by a zone having a circumferential width comparable to that of said surface.

5. A clutch plate assembly of the type set forth in claim 4 in which said alternating cushion engaging areas extend across said spring portion at a substantial angle to a radius through the clutch assembly and to a tangent thereof.

GEORGE I. GOODWIN.

REFERENCES CITED

The following references are of record in the file of this patent:

UNITED STATES PATENTS

| Number | Name | Date |
|---|---|---|
| 1,963,187 | Wood | June 19, 1934 |
| 2,097,627 | Lewis | Nov. 2, 1937 |
| 2,282,981 | Jarrett | May 12, 1942 |
| 2,321,821 | Katcher | June 15, 1943 |
| 2,324,913 | Daukus | July 20, 1943 |

Certificate of Correction

Patent No. 2,574,966                                                 November 13, 1951

GEORGE I. GOODWIN

It is hereby certified that error appears in the printed specification of the above numbered patent requiring correction as follows:

Column 8, line 39, for "cushion" read *clutch facing*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*